Aug. 30, 1966         W. MACK         3,269,228
DISC-LIKE SOCKET WRENCH HAVING LATERALLY PIVOTING ARMS
Filed Aug. 17, 1964

INVENTOR.
WILBUR MACK 3,269,228
DISC-LIKE SOCKET WRENCH HAVING
LATERALLY PIVOTING ARMS
Wilbur Mack, 168 Laurel St., Willits, Calif.
Filed Aug. 17, 1964, Ser. No. 390,114
1 Claim. (Cl. 81—177)

My invention is directed toward a mechanic's tool, which I call a short speed-handle, which can be used to start nuts or bolts in tight, hard-to-get-at places where there is no room to use a ratchet wrench.

It is an object of my invention to provide a new and improved short speed-handle of the character indicated.

Another object of my invention is to provide a new and improved short speed-handle of the character indicated which can be manufactured easily and inexpensively.

In my invention I provide a mechanic's tool having a disc with one surface thereof having a central recess and a shaft secured to the other surface of the disc at the center thereof and being perpendicular thereto. First and second curved arms are secured to the periphery of the disc by hinges connected to one end of each of the arms. The arms have a retracted position at which the arms are coincident with the periphery and an extended position at which the arms, secured each at one end to the periphery, extend outward and in opposite directions from the periphery.

Figure 1:
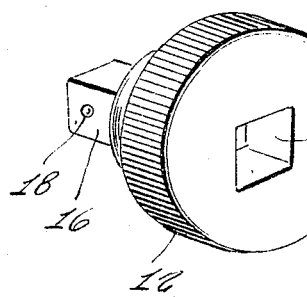
Figure 2:
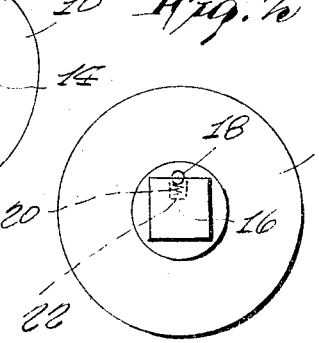
Figure 3:
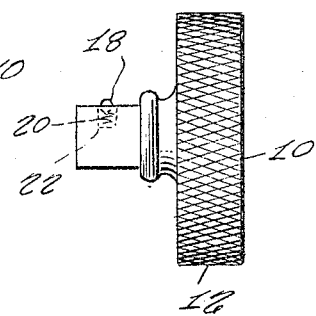
Figure 5:
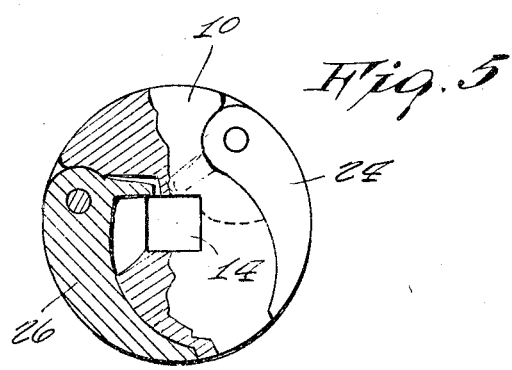
Figure 4:
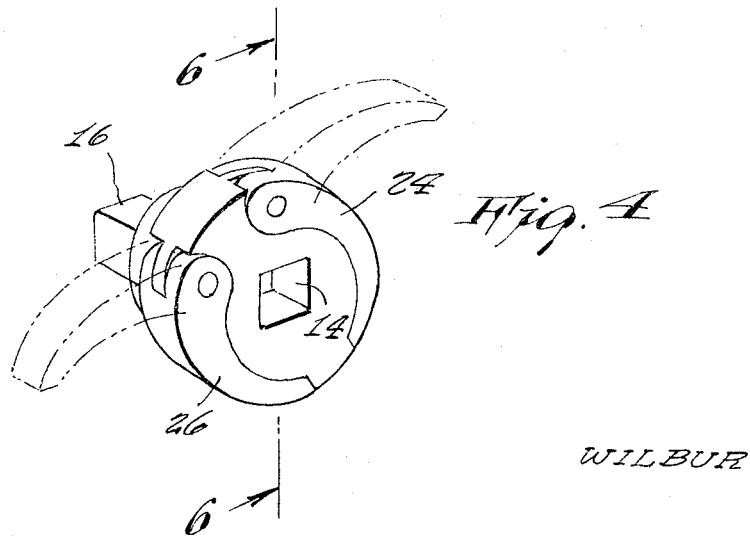

All of the foregoing and still further objects and advantages of my invention will either be explained or will become apparent hereinafter when this specification is studied together with the accompanying drawings, wherein:

FIGURE 1 is a perspective view of my invention;
FIGURE 2 is an end elevation view thereof;
FIGURE 3 is a side view thereof;
FIGURE 4 shows a modified form of my invention showing retractable levers;
FIGURE 5 is an end view, partially in cross-section of the device of FIGURE 4; and
FIGURE 6 is a cross-section through 6—6 of FIGURE 4.

Referring now to FIGURES 1–3, there is shown a disc 10 having a ribbed periphery 12 and a central recess 14 shaped for example as a square to hold a nut or bolt for starting. The disc can be held by one hand and turned to rotate the nut or bolt.

A square shaped arm 16 is secured to the rear of the disc and can be engaged by a flex handle or ratchet for remote turning of disc 10 as required. Arm 16 carries a ball 18 spring loaded by a spring 20 carried in a transverse slot 22 in arm 16. This ball can be employed to lock to the handle or ratchet.

Figure 6:
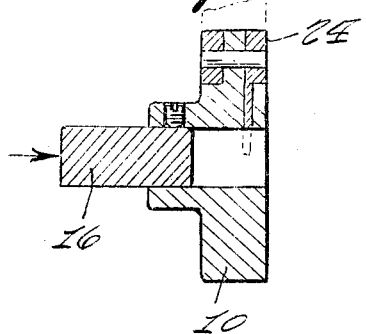

As shown in FIGURES 4–6, disc 10 can carry along its periphery two curved arms 24 and 26 having retracted positions in the disc (as shown in FIGURE 5) or extended positions (as shown in FIGURE 6). When the arms are extended, additional torque can be applied to the nut or bolt when these arms are gripped by hand and disc 10 is rotated accordingly.

While I have described my invention with particular reference to the drawings, my protection is to be limited only by the terms of the claim which follows:

I claim:

A mechanic's tool comprising a disc, one surface of the disc having a central polygonal recess to engage a correspondingly shaped fastener, first and second curved arms, each oppositely disposed about the periphery of the disc and having a curvature corresponding thereto, one end of one arm being hingedly secured to said periphery, one end of the other arm adjacent said one end of the other arm also being hinged to said periphery, said arms being spaced apart from each other, said arms having a retracted position at which the arms are coincident with said periphery and an extended position at which said arms extend in opposite directions away from said periphery.

References Cited by the Examiner
UNITED STATES PATENTS

| | | |
|---|---|---|
| 1,524,869 | 2/1925 | Kraft. |
| 2,612,807 | 10/1952 | Hunt _____ 81—58.1 |
| 2,726,695 | 12/1955 | Malm _____ 145—61 X |
| 2,982,160 | 5/1961 | Little _____ 81—58.1 X |
| 3,121,355 | 2/1964 | Morel et al. _____ 81—121 X |

FOREIGN PATENTS 522,892   3/1956   Canada.

WILLIAM FELDMAN, *Primary Examiner.*
MILTON S. MEHR, *Examiner.*